United States Patent
Saitoh et al.

(10) Patent No.: US 7,472,415 B2
(45) Date of Patent: *Dec. 30, 2008

(54) DIGITAL SIGNAL PROCESSING APPARATUS

(75) Inventors: Seiichi Saitoh, Tokyo (JP); Manabu Sasamoto, Yokohama (JP); Hiroo Okamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 789 days.

This patent is subject to a terminal disclaimer.

(21) Appl. No.: 10/976,924

(22) Filed: Nov. 1, 2004

(65) Prior Publication Data

US 2005/0089167 A1    Apr. 28, 2005

Related U.S. Application Data

(63) Continuation of application No. 09/362,041, filed on Jul. 28, 1999, now Pat. No. 6,839,851.

(30) Foreign Application Priority Data

Jul. 28, 1998    (JP)    ................................. 10-212273

(51) Int. Cl.
    G06F 7/04      (2006.01)
    G06K 19/00     (2006.01)
    G06C 7/00      (2006.01)
    H06L 7/32      (2006.01)

(52) U.S. Cl. ............................ 726/20; 707/102; 380/49

(58) Field of Classification Search .................. 707/102; 713/2, 201; 726/13, 20, 22; 380/49

See application file for complete search history.

(56) References Cited

U.S. PATENT DOCUMENTS 4,531,021 A    7/1985    Bluestein et al.
4,720,859 A    1/1988    Aaro et al.

(Continued)

FOREIGN PATENT DOCUMENTS

EP              714204        5/1996

(Continued)

OTHER PUBLICATIONS

5C Digital Transmission Content Protection White Paper, Jul. 14, 1998.

(Continued)

Primary Examiner—Kambiz Zand
Assistant Examiner—Monjour Rahim
(74) Attorney, Agent, or Firm—Mattingly, Stanger, Malur & Brundidge, P.C.

(57) ABSTRACT

If content is transmitted/received through a digital signal bus, protection of copyright causes a problem because of no deterioration in quality. Accordingly, authentication is required. The quantity of information to be processed is, however, so large that a long time is required for authentication. Accordingly, both achievement of handling property as in conventional analog connection and protection of copyrighted content without user's awareness become an object. The foregoing object can be achieved by authentication which is executed, for management of copyright, among apparatuses connected to the digital signal bus when the apparatuses are powered on or connected to the digital signal bus or when an input terminal connected to the digital signal bus is selected. The object can be further achieved by an encryption key shared among these apparatuses.

19 Claims, 7 Drawing Sheets

U.S. PATENT DOCUMENTS

| | | | |
|---|---|---|---|
| 5,117,458 A | 5/1992 | Takaragi et al. | |
| 5,999,629 A * | 12/1999 | Heer et al. | 380/49 |
| 6,320,829 B1 | 11/2001 | Matsumoto et al. | |
| 6,519,701 B1 * | 2/2003 | Kawamura et al. | 713/2 |
| 6,570,990 B1 | 5/2003 | Kohn et al. | |
| 6,721,891 B1 * | 4/2004 | Borza | 726/20 |
| 6,802,010 B1 * | 10/2004 | Kim et al. | 726/20 |
| 6,839,851 B1 * | 1/2005 | Saitoh et al. | 713/201 |
| 7,325,002 B2 * | 1/2008 | Zuk | 707/102 |
| 2007/0300298 A1 * | 12/2007 | Goranson et al. | 726/22 |
| 2008/0022388 A1 * | 1/2008 | Grewal et al. | 726/13 |

FOREIGN PATENT DOCUMENTS

| | | |
|---|---|---|
| EP | 763936 | 3/1997 |
| EP | 0858183 A2 | 8/1998 |
| EP | 874299 | 10/1998 |
| EP | 875813 A2 | 11/1998 |
| EP | 875813 A3 | 9/1999 |
| JP | 2214966 | 8/1990 |
| JP | 4302682 | 10/1992 |
| JP | 6261033 | 9/1994 |
| JP | 8137686 | 5/1996 |
| JP | 9179812 | 7/1997 |
| JP | 2002501708 | 1/2002 |
| WO | 9701902 | 1/1997 |
| WO | WO 97/28630 | 8/1997 |
| WO | WO 97/49057 | 12/1997 |
| WO | WO/98/02881 | 1/1998 |

OTHER PUBLICATIONS

Nikkei Electronics 1998, 3, 23, (No. 712), pp. 47-53.

* cited by examiner

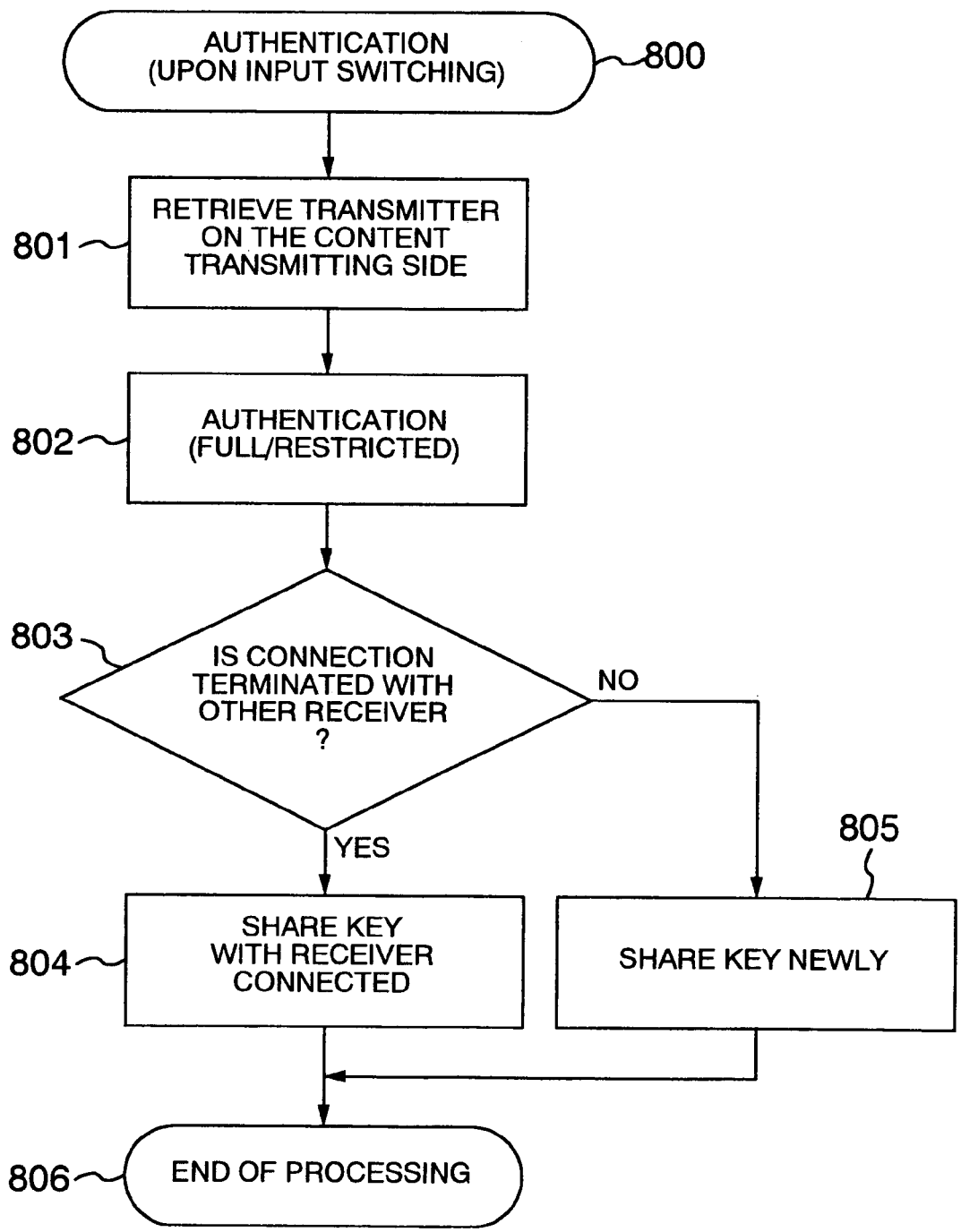

DIGITAL SIGNAL PROCESSING APPARATUS

This application is a continuation of U.S. patent application Ser. No. 09/362,041, filed Jul. 28, 1999, now U.S. Pat. No. 6,839,851 which is incorporated by reference herein in its entirety.

BACKGROUND OF THE INVENTION

The present invention relates to digital signal processing apparatuses connected to each other for transmitting/receiving content having copyright.

If content is transmitted/received through a digital signal bus, video signals/audio signals, data, etc. can be transmitted/received without deterioration of quality, and this gives a large merit to users. Protection of copyright, however, causes a problem because there is no deterioration in quality. A technique for encrypting the content to be transmitted/received through a digital signal bus is described in NIKKEI Electronics, No. 712, Mar. 23, 1998, pp. 47-53. According to this technique, authentication is performed on transmission and reception side apparatuses so that the transmission/reception of content is enabled only between the apparatuses where authentication is established. The process protects copyrighted content from illegal copying.

Not only content but also information for controlling respective apparatuses can be transmitted through the aforementioned digital signal bus. Accordingly, one apparatus can control all the apparatuses connected to the one apparatus through a digital signal bus.

Although the use of the aforementioned technique makes it possible to protect the copyright of content, both authentication and encryption among apparatuses are so complex and the quantity of information to be processed is so large that a long time is required for processing. Furthermore, as the number of connected apparatuses increases, the quantity of information to be processed increases. Accordingly, there arises a problem in handling property. As described above, when content is to be transmitted/received through a digital signal bus, both achievement of handling property bearing comparison with that of conventional analog signals and protection of the copyright of the content without users' awareness become a problem to be solved.

Although the use of the aforementioned technique makes it possible for any one of the apparatuses to control all the apparatuses, there are numbers of handling ways for one purpose. Accordingly, there is a possibility that users hardly understand the handling ways.

SUMMARY OF THE INVENTION

An object of the present invention is to solve the aforementioned problem, that is, to provide a digital signal processing apparatus improved both in the connecting way and in the handling property of the digital signal processing apparatus to protect the copyright of content without user's awareness.

The foregoing object can be achieved by provision of an interface means which performs authentication among all apparatuses connected to a digital signal bus when a power source is turned on.

The object can be further achieved by provision of an interface circuit which performs authentication among all apparatuses connected to a digital signal bus when an apparatus is connected to the digital signal bus.

The object can be further achieved by provision of an interface circuit which performs authentication among all apparatuses connected to a digital signal bus when an input terminal connected to the digital signal bus is selected.

The object can be further achieved by provision of a storage circuit which stores a key used among all apparatuses connected to a digital signal bus.

The object can be further achieved by provision of an interface circuit which changes a transmission channel of a digital signal bus in accordance with copyright control information with content.

The object can be further achieved by provision of a circuit which defines names of all apparatuses connected to a digital signal bus on each apparatus side.

BRIEF DESCRIPTION OF THE DRAWINGS

FIG. 8 is a flow chart showing authentication among apparatuses.

DESCRIPTION OF THE EMBODIMENTS

An embodiment of the present invention will be described below with reference to the drawings.

Figure 1:
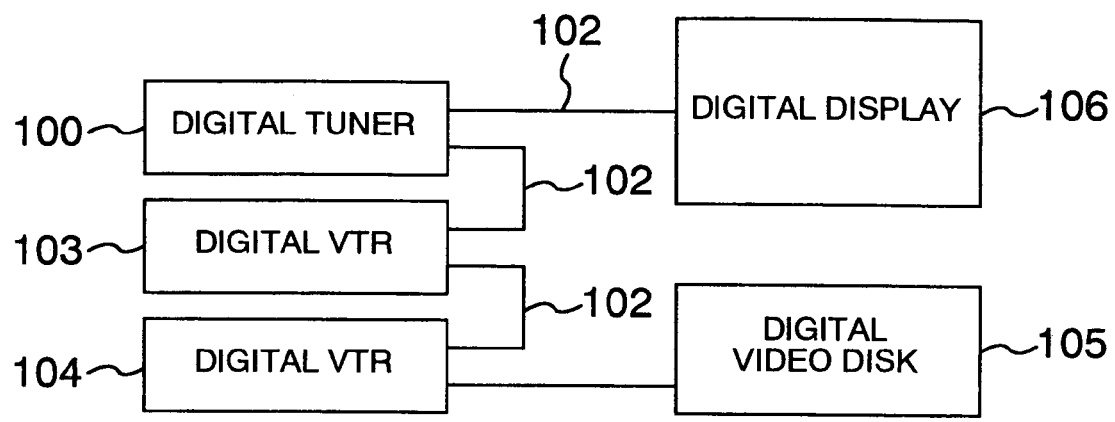
FIG. 1 is a configuration view of an embodiment for explaining the way of connecting digital signal processing apparatuses according to the present invention.

FIG. 1 shows an example of configuration for explaining an example of the way of connecting digital signal processing apparatuses according to the present invention. In FIG. 1, the reference numeral 100 designates a digital tuner; 102, a digital signal bus; 103 and 104, digital VTRs; 105, a digital video disk; and 106, a digital display.

First, in each of devices connected to the digital signal bus 102 in FIG. 1, an operation of initializing the digital signal bus 102 is started. In this occasion, an apparatus on a root of the bus is decided on the basis of data transmission/reception among respective interface circuits of apparatuses 100 to 105. The thus decided root apparatus performs management so that signal conflict does not occur in terms of the transmission channel and timing of the bus. The apparatuses other than the root apparatus inquire of the root apparatus about the transmission channel and timing of the bus. When there is no conflict, the other apparatuses are permitted to use the bus.

Figure 2:
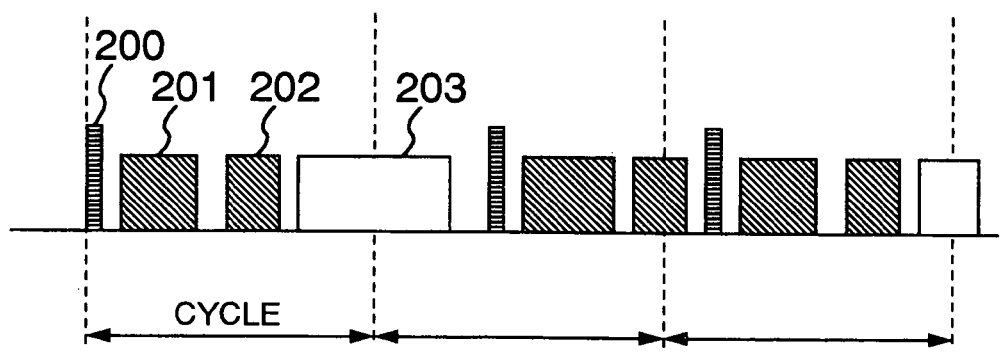
FIG. 2 is a time chart of a digital signal bus.

A transmitting operation of the digital signal bus 102 will be described below. FIG. 2 shows the state of transmission of the digital signal bus 102. In FIG. 2, the reference numeral 200 designates a cycle start packet; 201, AV data A; 202, AV data B; and 203, asynchronous transmission data. The terminology "AV data" means audio/video mixed data. FIG. 2 shows an example in which two AV data streams are transmitted. In this manner, two streams are transmitted with different time-derived channels being secured. The asynchronous transmission data 203 are data concerning commands, settings, etc. for respective apparatuses.

The time between adjacent broken lines in FIG. 2 is called "cycle". In the term of one cycle, the bus is controlled so that transmission bands for the AV data A 201 and the AV data B 202 are secured as sufficiently as possible. The asynchronous transmission data 203 is transmitted after completion of the transmission of the AV data A 201 and the AV data B 202. Specifically, though the transmission of the AV data A 201, the AV data B 202 and the asynchronous transmission data 203 follows the transmission of the cycle start packet 200, waiting is set before the transmission of the asynchronous transmission data 203 when the period of cycle cannot be fulfilled.

Then, authentication is performed among the apparatuses. Authentication is classified into two authentication levels— full and restricted. The two authentication levels are used appropriately in accordance with copyright control information and apparatus content. Full authentication is established only in the case where both transmitter-side and receiver-side apparatuses have public keys respectively. When full authentication is established, any content is enabled to be transmitted even if the content is a copy-prohibited one. Examples of the receiver-side apparatus having a public key include: apparatuses each having no recording device, such as an digital display, etc.; and apparatuses each having any recording device permitted to perform recording for a charge, or the like. Restricted authentication is authentication for apparatuses each having no key but a common key. That is, restricted authentication is intended for apparatuses each having some recording devices, such as a digital VTR, etc. In restricted authentication, copy-prohibited content is disabled from being transmitted. These operations are shown collectively in FIG. 3.

Figure 3:
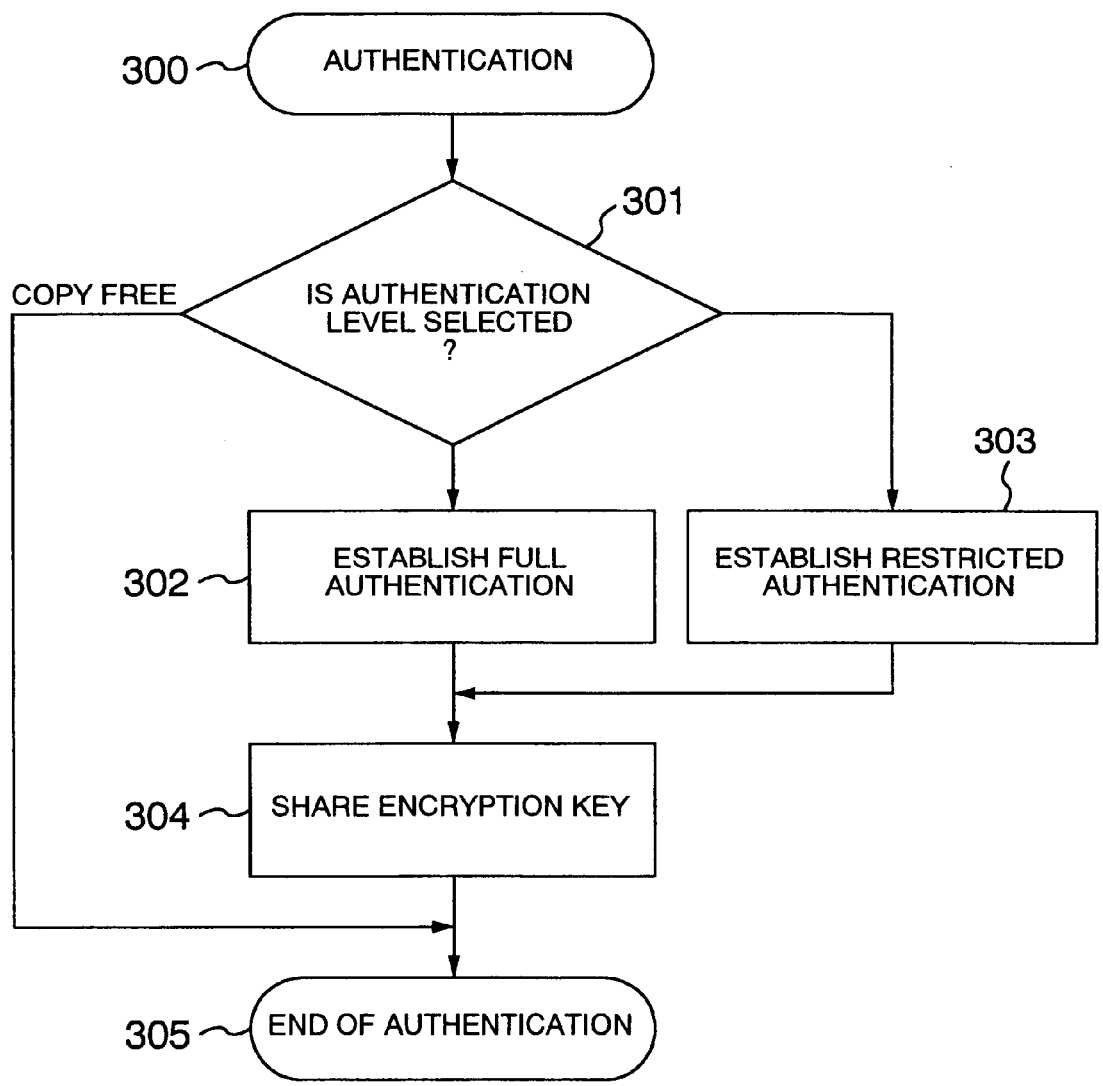
FIG. 3 is a flow chart showing authentication.

In step 301 in FIG. 3, the level of authentication is selected in accordance with the authentication level of another apparatus and the copy control information of content to be transmitted. For content that can be copied freely, the authentication process is terminated in step 305 because no authentication or encryption is required for the content. After the authentication level is selected in the step 301, full authentication is established in step 302 or restricted authentication is established in step 303. In step 304, thereafter, an encryption key used to encrypt content is then shared. In step 305, the authentication process is terminated.

The aforementioned process is required to transmit/receive content that cannot be copied freely. The quantity of calculation is, however, so large that a large time is required for the authentication process. Accordingly, when the authentication process should be executed becomes a subject of discussion.

Figure 4:
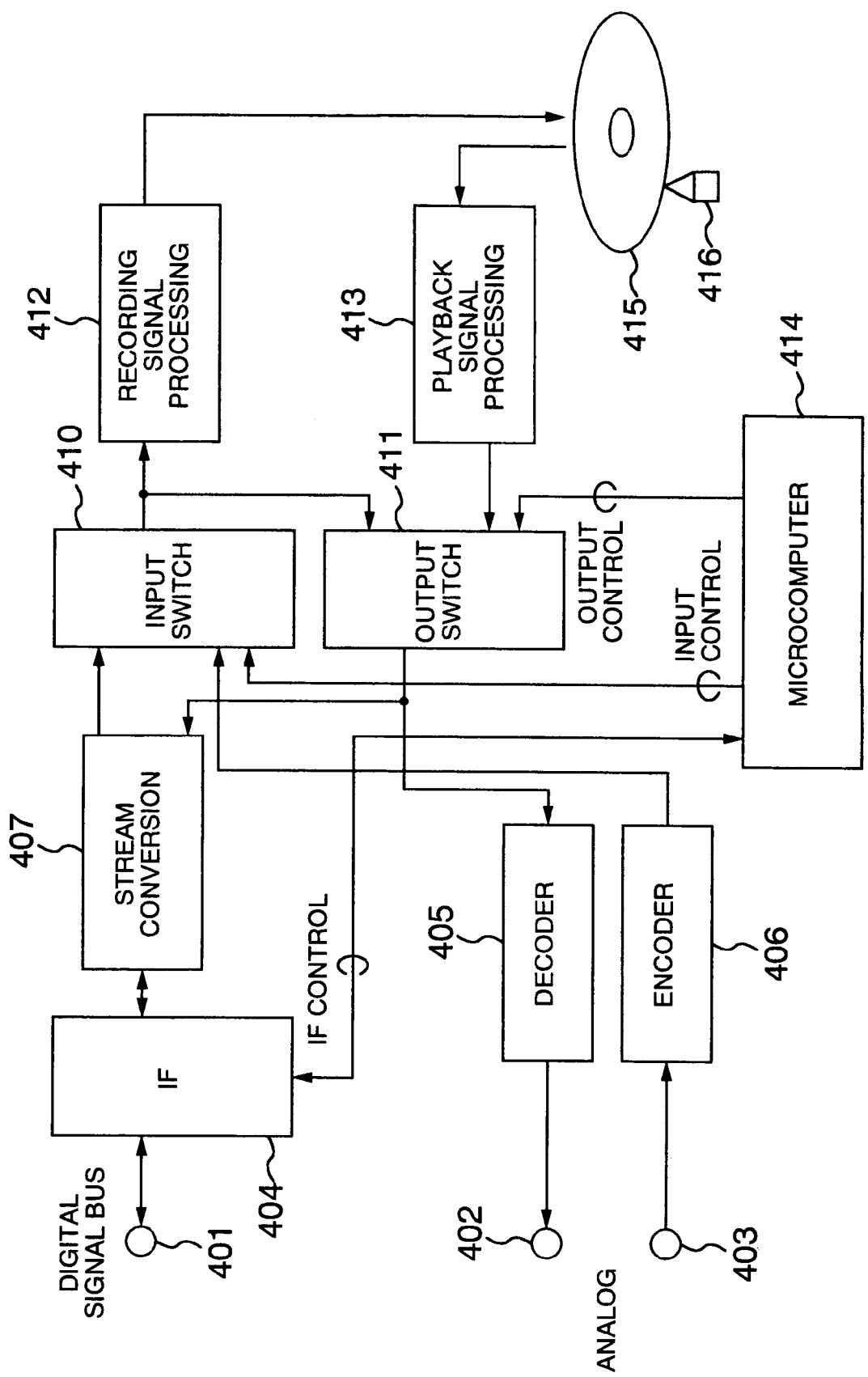
FIG. 4 is a view showing the configuration of the digital video disk depicted in FIG. 1.

The inside of an apparatus connected to the digital signal bus 102 will be described below. The inside of the digital video disk 105 will be described below as an example with reference to FIG. 4. In FIG. 4, the reference numeral 401 designates a digital signal bus input/output terminal; 402, an analog output terminal; 403, an analog input terminal; 404, an interface (hereinafter referred to as IF) circuit; 405, a decoder; 406, an encoder; 407, a stream conversion circuit; 410, an input switching circuit; 411, an output switching circuit; 412, a recording signal processing circuit; 413, a playback signal processing circuit; 414, a microcomputer; 415, a disk; and 416, a pickup.

Bus control and authentication are processed mainly by the IF circuit 404. First, the basic operations of the apparatus will be described below.

A recording operation is as follows. When the input switching circuit 410 is controlled to select "analog input" on the basis of an input control signal from the microcomputer 414, an analog signal received from the analog input terminal 403 is encoded by the encoder 406 by using a method such as so-called MPEG. In the case of a transport stream from the digital signal bus 102, a desired stream is extracted by the IF circuit 404 to reproduce timing. The transport stream is then converted into a digital disk stream by the stream conversion circuit 407. The digital disk stream is recorded on the disk 415 by use of the recording signal processing circuit 412. In this occasion, the stream being recorded can be monitored because even the stream from the digital signal bus 102 can be decoded by the decoder 405.

A reproducing operation is as follows. Playback data from a signal recorded on the disk 415 are read by the pickup 416. A compressed digital signal is reproduced by the playback signal processing circuit 413. The output switching circuit 411 is controlled on the basis of an output control signal from the micro-computer 414 to select "monitor output" or "playback output" of the input signal. The output of the output switching circuit 411 is sent both to the decoder 405 and to the stream conversion circuit 407. The decoder 405 converts the compressed digital signal into an analog signal and the analog signal is outputted from the analog signal output terminal 402. The stream conversion circuit 407 converts the signal into a transport stream that can be transmitted through the digital signal bus. The transport stream is sent to the IF circuit 404 and then outputted from the digital signal bus input/output terminal 401.

In this manner, even the signal reproduced from the disk can be transmitted to the digital signal bus because the signal can be converted into a transport stream by the stream conversion circuit 407.

Figure 5:
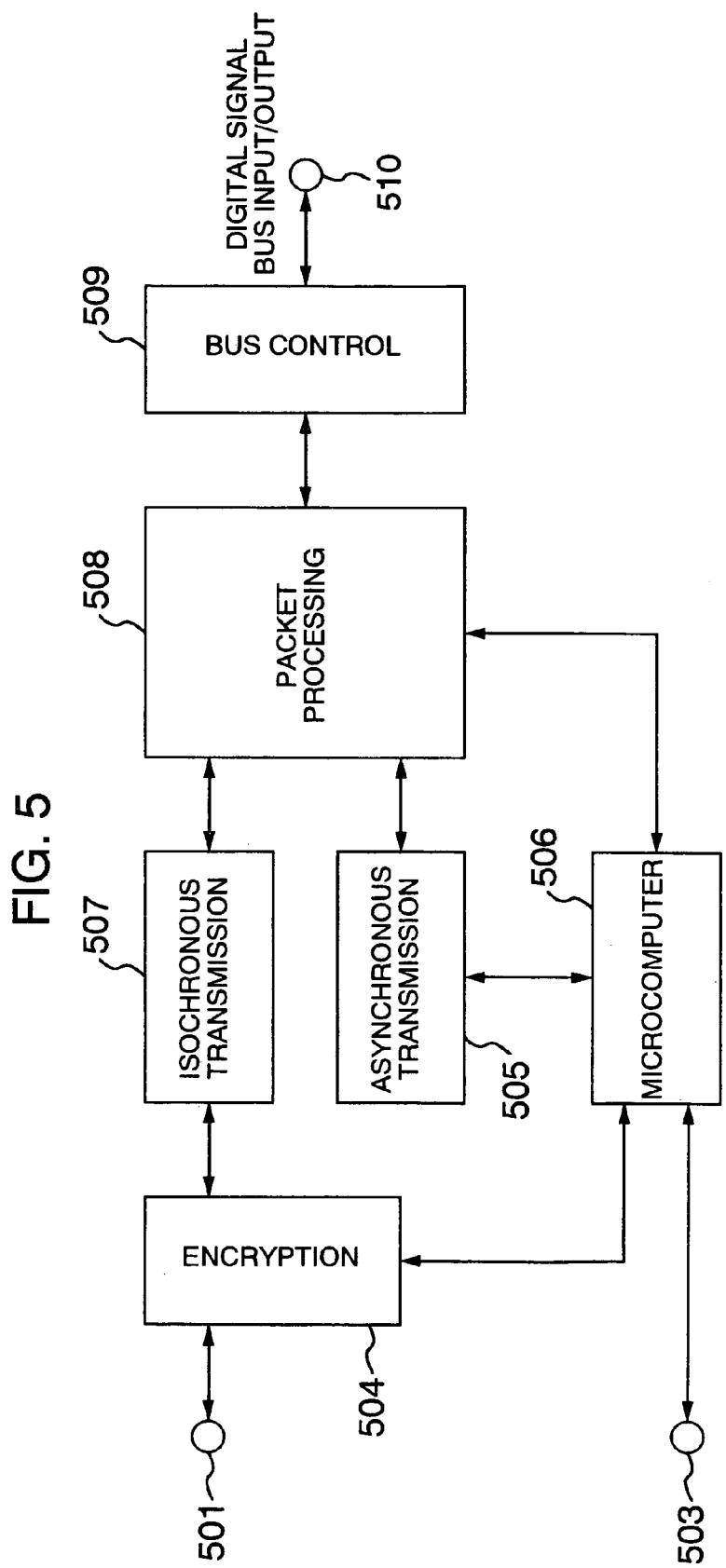
FIG. 5 is a view showing the configuration of the IF circuit depicted in FIG. 4.

The operation of the IF circuit 404 will be described below with reference to FIG. 5. In FIG. 5, the reference numeral 501 designates a stream input/output terminal; 503, an IF control signal input/output terminal; 504, an encryption circuit; 505, an asynchronous transmission circuit; 506, a microcomputer; 507, an isochronous transmission circuit; 508, a packet processing circuit; 509, a bus control circuit; and 510, a digital signal bus input/output terminal.

The aforementioned bus initializing operation is executed by the bus control circuit 509. Specifically, the initializing operation is executed on the basis of communications among respective bus control circuits of digital apparatuses connected to the digital signal bus. When the initializing operation is completed so that the root apparatus is decided, the microcomputer 506 recognizes information, concerning the connection of respective digital apparatuses, through the packet processing circuit 508. After the recognition of information concerning the connection of respective digital apparatuses, the microcomputer 506 performs connection for apparatuses permitted to be connected and then performs authentication. The processes of connection and authentication are carried out as follows. A command from the microcomputer 506 is converted into a transmission packet by the packet processing circuit 508 through the asynchronous transmission circuit 505. The transmission packet is transmitted/received on the digital signal bus by the bus control circuit 509 through the digital signal bus input/output terminal 510.

After these processes, the information concerning the connection of respective digital apparatuses is transmitted to the microcomputer 414 in FIG. 4. The microcomputer 414 supplies the connection information to a display not shown. The display indicates the configuration of apparatuses to the user as to whether an apparatus can be connected or not and as to whether data can be transmitted to the apparatus or not. The user utilizes the connection information for selection of connection of apparatuses. In this manner, the connection information is displayed to the user so that the user is prevented from hesitating over which apparatus to connect.

There are some cases where the user can hardly identify apparatuses, for example, because of the presence of two digital VTRs as shown in FIG. 1, the increase of the number of connected apparatuses, and so on. Therefore, the respective names of these apparatuses can be also defined freely by the user. For example, the names of the two digital VTRs 103 and 104 are defined as "DVTR1" and "DVTR2" respectively and the name of the digital tuner 100 is defined as "BS-D" on the basis of its broadcasting service name. This definition makes it possible to provide interfaces that can be understood easily by the user.

After the completion of connection and authentication, a stream is enabled to be transmitted/received. A stream on the digital signal bus 102 is received as follows. First, a transmission packet is received by the bus control circuit 509. The transmission packet thus received is converted by the packet processing circuit 508 with the time interval reproduced by the isochronous transmission circuit 507 to reproduce a transport stream. The transport stream is decrypted by the decryption circuit 504 by using the shared key established in authentication. The decrypted stream is outputted from the stream input/output terminal 501. A stream is sent onto the digital signal bus 102 as follows. First, a stream from the stream input/output terminal 501 is encrypted by the encryption circuit 504 by using the shared key established in authentication. The microcomputer 414 in FIG. 4 makes a judgment, on the basis of copy information recorded on the video disk, as to whether the stream should be encrypted by the encryption circuit 504 or not. The microcomputer 414 is communicated with the microcomputer 506 to control the judgment. A time stamp for reproducing the time interval is added to the stream by the isochronous transmission circuit 507 and the stream is converted into a transmission packet by the packet processing circuit 508. The transmission packet is transmitted as a stream output onto the digital signal bus 102 by the bus control circuit 509.

When authentication should be executed and how authentication should be executed will be described below. First, description will be made upon the case where a controller controls all apparatuses, that is, for example, upon the case where electric sources of apparatuses are turned on at the same time in the condition that the digital display 106 is used as the controller.

Authentication is started by a receiver-side request. Accordingly, it can be considered that the controller sends a command to a receivable apparatus to execute authentication. In FIG. 1, receivable apparatuses are the digital VTRs 103 and 104, the digital video disk 105 and the digital display 106 whereas transmittable apparatuses are all the apparatuses except the digital display 106. After electric sources of apparatuses are turned on, the digital display 106 used as the controller sends a command to each of the receiver apparatuses to control the receiver apparatus to execute authentication for the respective transmitter apparatuses.

Figure 6:
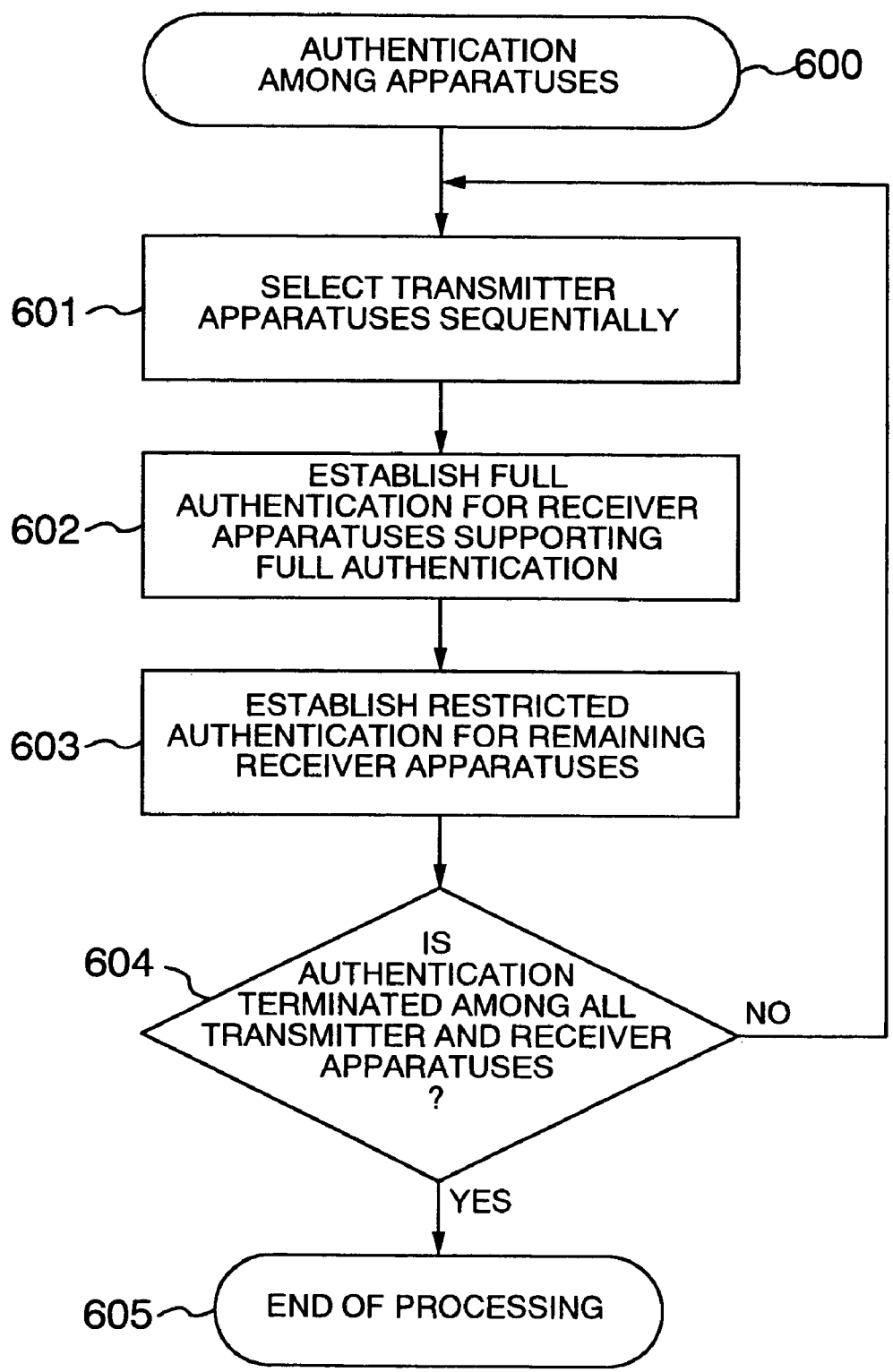
FIG. 6 is a flow chart showing authentication among apparatuses.

The procedure of processing in this occasion is shown in FIG. 6. In step 601, a transmitter apparatus, for example, the digital tuner 100, is selected. In step 602, full authentication is executed for an apparatus supporting full authentication. For example, in FIG. 1, the apparatus supporting full authentication is the digital display 106. The digital display 106 makes an authentication request to the digital tuner 100. Authentication is then executed, so that a key is stored so as to be shared. In step 603, restricted authentication is executed between the digital tuner 100 and each of receiver apparatuses supporting restricted authentication, that is, each of the digital display 106, the digital VTRs 103 and 104 and the digital video disk 105. Thus, a key is stored so as to be shared between the digital tuner 100 and each of the digital display 106, the digital VTRs 103 and 104 and the digital video disk 105. In step 604, confirmation is made as to whether authentication is terminated among all transmitter and receiver apparatuses. When authentication is not terminated, the situation of the procedure goes back to the step 601 and another transmitter apparatus, for example, the digital video disk 105, is selected to repeat authentication in the aforementioned manner. Incidentally, apparatuses with no authentication are put out of this processing.

Although the above description has been made upon the case where electric sources are turned on, content transmitted as encrypted content can be received without a break also in the case where authentication is executed when a new apparatus is connected to the digital signal bus 102 or before content is transmitted/received. Further, because the shared key is stored, authentication is not required to be executed newly in the digital display 106 even in the case where the copy control information of content from a transmitter apparatus is changed. Accordingly, the picture is not interrupted. Since the key is shared between the digital tuner 100 and each of the digital display 106, the digital VTRs 103 and 104 and the digital video disk 105, even if content which requires restricted authentication is transmitted, the content can be received by all the apparatuses. Accordingly, the user does not feel out of place compared with analog signal connection.

Although the above processing has been described in the case where electric sources of apparatuses connected to the digital signal bus 102 are turned on at the same time, the apparatus serving as the controller can detect turned-on apparatuses to perform processing for the apparatuses successively even in the case where the electric sources of the apparatuses are turned on separately.

Even in the case where a main electric source is off, the connection state can be kept so long as an electric source for the IF circuit 404 is supplied in a standby state, or the like. Accordingly, authentication is not required to be executed newly.

It can be further considered that an apparatus is connected to the digital signal bus 102 after an electric source for the apparatus is turned on. Also in this case, the controller detects the connection of the bus to execute authentication so that a key can be shared.

Another apparatus than the controller may detect these newly connected apparatuses so that a series of operations from initialization to re-connection may be performed after the bus is reset.

There is the case where only one encryption key per one transmission channel is used limitatively. In this case, authentication is required again when the copy control information of content is changed. However, the same effect as described above is obtained by preparing transmission channels for each copy control information of content and executing authentication and storing the keys.

The case where no controller is set specifically will be described below. Because a receiver apparatus substantially makes an authentication request, the operation of the receiving apparatus will be described mainly. Processing of the digital VTR 103 as an example of the receiver apparatus in FIG. 1 will be described. First, one transmitter apparatus is retrieved. If there are a plurality of transmitter apparatuses, one transmitter apparatus is selected from the plurality of transmitter apparatuses. In FIG. 1, the digital video disk 105 is selected. Then, authentication is performed between the selected digital video disk 105 and the digital VTR 103. If both restricted authentication and full authentication are permitted, full authentication is used here. Then, confirmation is made as to whether the digital video disk 105 is already connected to another receiver apparatus or not. When, for example, the digital video disk 105 is already connected to the digital display 106, what is meant by the connection is that authentication is terminated and that a key is already shared. Accordingly, the same key is stored so as to be shared with the digital VTR 103. When the digital video disk 105 is not connected yet, a new key is shared. The aforementioned process is repeated until authentication is terminated among all transmitter apparatuses.

Alternatively, keys serving as seed of encryption key may be shared when authentication is performed. The encryption key is updated successively at regular time intervals by a mutually decided calculation method by using keys as a seed of encryption key.

Figure 7:
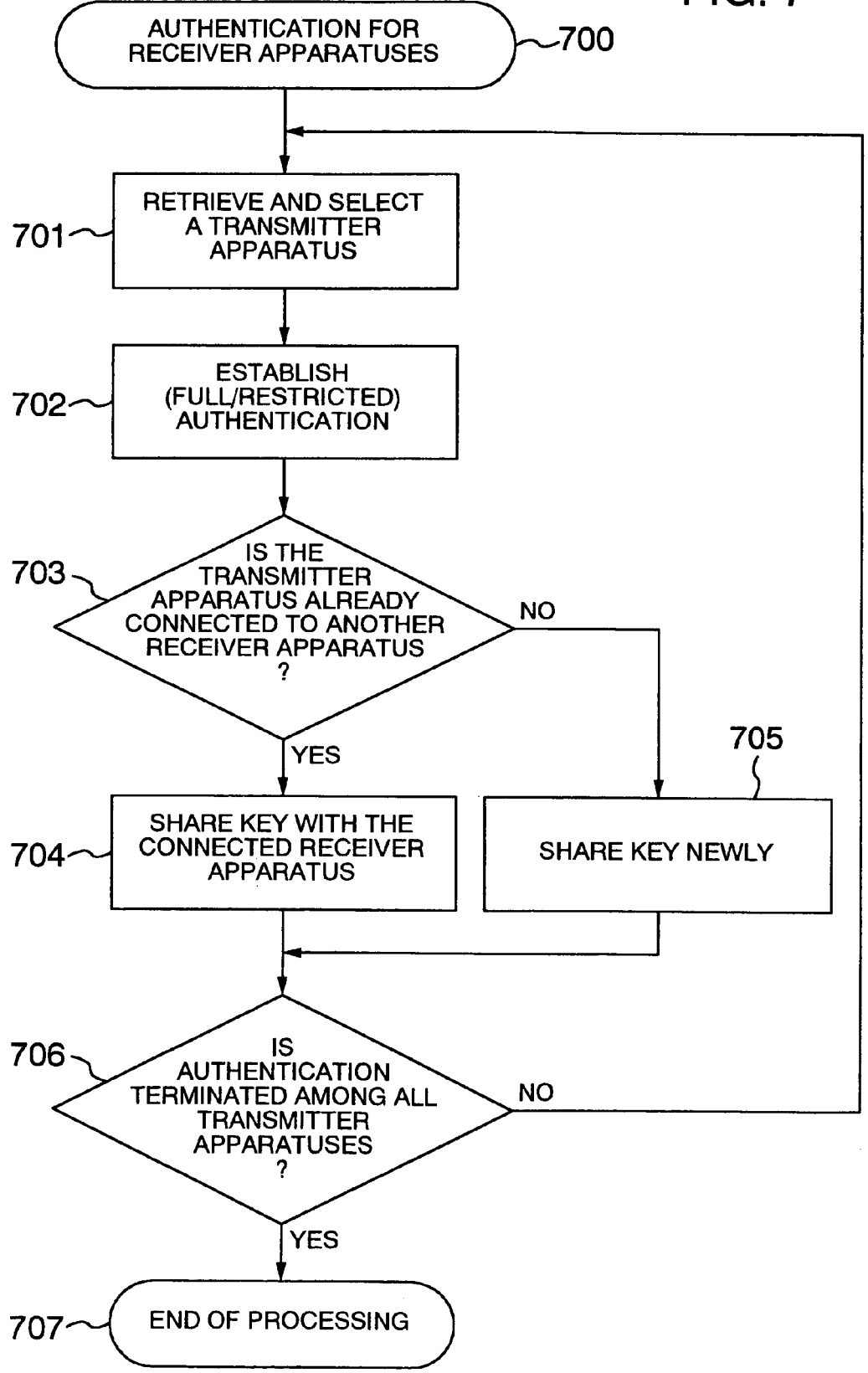
FIG. 7 is a flow chart showing authentication among apparatuses.

The aforementioned procedure is shown in FIG. 7. In step 701 in FIG. 7, first, a transmitter apparatus is selected by retrieval. In step 702, authentication is performed between the selected transmitter apparatus and a receiver apparatus serving as the controller. In step 703, confirmation is made as to whether the selected transmitter apparatus is already connected to another receiver apparatus. When the selected transmitter apparatus is already connected, what is meant by the connection is that authentication is terminated and that a key is already shared. Accordingly, when the selected transmitter apparatus is already connected, the same key as used in the connected receiver apparatus is shared in step 704. When the selected transmitter apparatus is not connected yet, a new key is shared in step 706. The aforementioned process is repeated until authentication is terminated among all transmitter apparatuses in step 706.

The process in FIG. 7 can be also used in the aforementioned manner when a new receiver apparatus is connected or powered on. Even in the case where a new transmitter apparatus is connected or powered on, authentication can be performed in the aforementioned manner on the basis of detection of the transmitter apparatus. Further, even in the case where the selected transmitter apparatus is already connected to another receiver apparatus and is transmitting content to the already connected receiver apparatus, authentication can be performed in the aforementioned manner.

As described above, the aforementioned process is performed by each of receiver apparatuses so that a key is stored in accordance with the copy control information, even in the case where no controller is set specifically. Accordingly, even in the case where the copy control information of content from transmitter apparatuses is changed, the picture is not interrupted because authentication is not required. Further, a key per a transmitter apparatus can be shared to respective receiver apparatuses. Accordingly, even in the case where content requiring restricted authentication is transmitted, the content can be received by all the receiver apparatuses. The user does not feel out of place compared with analog signal connection.

Although the embodiment has been described upon the case where both connection and authentication are performed for all apparatuses, the same effect as described above can be also obtained when both connection and authentication are performed only for apparatuses registered in advance or subjected to data transmission in the past in the case where the processing time becomes noticeably large because of connection of an extremely large number of apparatuses, or the like.

There is a further case where a plurality of systems each having the connection form as shown in FIG. 1 are connected through bridges. In this case, authentication is performed for apparatuses connected in a bridge. The same effect as described above is obtained when authentication is performed whenever content is transmitted in the case where apparatuses are connected through a bridge.

The case where authentication is performed when the input is switched will be described below. The digital video disk 105 has both an analog input and a digital input. Accordingly, the digital video disk 105 may be designed so that authentication is performed when the digital input is selected. In this case, a certain processing time is required for switching the input. The burden imposed on processing, however, becomes light because connection is performed only in the case of necessity.

Processing in this occasion is shown in FIG. 8. In step 801, a transmitter apparatus which is transmitting content is retrieved to select a target transmitter apparatus. In step 802, authentication is performed. In step 803, confirmation is made as to whether the selected transmitter apparatus is already connected to another apparatus. If the selected transmitter apparatus is already connected, the same key as used in the already connected apparatus is shared in step 804. If the selected transmitter apparatus is not connected yet, a new key is shared in step 805. As described above, the burden imposed on processing is light because connection is performed only in the case of necessity. Although this embodiment has been described upon an apparatus having both an analog input and a digital input, the same effect as described above is obtained also in the case where the apparatus has two or more digital inputs. Although the above description has been made upon the digital video disk, the same processing as described above is performed upon another digital apparatus.

The aforementioned authentication can be performed in the same manner as described above in the case where it is applied to other information than copy information and copyright information.

In the digital signal processing apparatus according to the present invention, authentication is performed for management of copyright among apparatuses connected to a digital signal bus, when the apparatuses are powered on or connected to the digital signal bus. Accordingly, even in the case where content requiring restricted authentication is transmitted, the content can be received immediately.

Further, authentication is performed for management of copyright among apparatuses connected to a digital signal bus, when an input terminal connected to the digital signal bus is selected. Accordingly, the burden imposed on processing is light because connection is performed only in the case of necessity.

Further, a key used among apparatuses connected to a digital signal bus is stored. Accordingly, even in the case where the copy control information of content from a transmitter apparatus is changed, authentication is not required so that the picture is not interrupted because the key is stored.

Further, the transmission channel of the digital signal bus is changed in accordance with the copyright control information attendant on content. Accordingly, even in the case where only one key can be established for one transmission channel, authentication is not required so that the picture is not interrupted because the key is stored though the copy control information of content from a transmitter apparatus is changed.

Further, an apparatus defines the respective names of apparatuses connected to the digital signal bus. Accordingly, an interface understood easily by the user can be provided.

What is claimed is:

1. A digital signal receiver apparatus comprising:
a digital signal bus input/output circuit which connects to a digital signal bus and transmits or receives a digital signal to or from external digital signal transmitter apparatuses connected to said digital signal bus;

a controller which generates instructions to said external digital signal transmitter apparatuses and executes instructions from said external digital signal transmitter apparatuses;

a decryptor which decrypts a signal from said external digital signal transmitter apparatuses;

a packet processing circuit which converts an instruction from said controller to a transmission packet, and converts a received packet from said external digital signal transmitter apparatuses to an instruction to said controller, and converts a received packet from said external digital signal transmitter apparatuses to a digital signal to said decryptor; and a bus control circuit which transmits said transmission packet to said digital signal bus and receives said received packet from said digital signal bus via said digital signal bus input/output circuit;

wherein said controller requests an authentication at a predetermined timing by generating an instruction for authentication request and performs the authentication to said external digital signal transmitter apparatuses and shares key information by exchanging said instructions with said transmission packets and received packets, and said decryptor decrypts said digital signal on the basis of said key information.

2. A digital signal receiver apparatus according to claim 1, wherein said controller requests authentication when said digital signal receiver apparatus is turned on, and performs the authentication to said external digital signal transmitter apparatuses and shares key information.

3. A digital signal receiver apparatus according to claim 1, wherein said controller requests authentication when said external digital signal transmitter apparatuses are turned on, and performs the authentication to said external digital signal transmitter apparatuses and shares key information.

4. A digital signal receiver apparatus according to claim 1, wherein said controller requests authentication when said digital signal receiver apparatus is connected to said digital signal bus, and performs the authentication to said external digital signal transmitter apparatuses and shares key information.

5. A digital receiver apparatus according to claim 1, wherein said controller requests authentication when said external digital signal transmitter apparatuses are connected to said digital signal bus, and performs the authentication to said external digital signal transmitter apparatuses and shares key information.

6. A digital signal receiver apparatus according to claim 1, further comprising:

at least one input terminal including an input terminal from said digital signal bus; and a switching circuit for selecting said input terminal, wherein said controller requests authentication when said input terminal connected to said digital signal bus is selected by said switching circuit, and performs the authentication to said external digital signal transmitter apparatuses and shares key information.

7. A digital signal receiver apparatus according to claim 1, wherein said controller searches external digital signal transmitter apparatuses connected to said digital signal bus, requests authentication when said controller finds external digital signal transmitter apparatuses, and then performs the authentication to found external digital signal transmitter apparatuses and shares key information.

8. A digital signal receiver apparatus according to claim 1, wherein said controller requests authentication when said controller finds an external digital signal transmitter apparatuses which are transmitting a digital video signal and/or a digital audio signal, and performs the authentication to said external digital signal transmitter apparatuses and shares key information.

9. A digital signal receiver apparatus according to claim 1, wherein said controller requests authentication when said controller finds external digital signal transmitter apparatuses which are transmitting a digital video signal and/or audio signal that cannot be copied freely, and performs the authentication to said external digital signal transmitting apparatuses and shares key information.

10. A digital signal receiver apparatus according to claim 1, wherein said controller requests authentication when said controller finds external digital signal transmitter apparatuses which were previously registered, and performs the authentication to said external digital signal transmitter apparatuses and shares key information.

11. A digital signal receiver apparatus according to claim 1, wherein said controller requests authentication when said controller finds external digital signal transmitter apparatuses which said digital signal receiver apparatus received a digital video signal and/or a digital audio signal from in the past, and performs the authentication to said external digital signal transmitter apparatuses and shares key information.

12. A digital signal processing method using a digital signal receiver apparatus which connects to external digital signal transmitter apparatuses through a digital signal bus, said method comprising the steps of:

when said digital signal receiver apparatus is turned on, converting an instruction from a controller to a transmission packet and converting a received packet to an instruction to said controller in a packets processing circuit;

transmitting said transmission packets from the packets processing circuit to said digital signal bus and receiving said received packets from said digital signal bus to said packets processing circuit via a digital signal bus input/output circuit by a bus control circuit;

requesting authentication by said transmission packets from said digital signal receiver, to said external digital signal transmitter apparatuses connected to the digital signal receiver apparatus; and performing the authentication to said external signal transmitter apparatuses by said transmission packets and received packets and sharing key information for decrypting said digital signal on the basis of said key information.

13. A digital signal processing method using a digital signal receiver apparatus, said method comprising the steps of:

when said digital signal receiver apparatus is connected to one of the external signal transmitter apparatuses, converting an instruction from a controller to a transmission packet and converting a received packet to an instruction to said controller in a packets processing circuit;

transmitting said transmission packets from the packets processing circuit to said digital signal bus and receiving said received packets from said digital signal bus to said packets processing circuit via a digital signal bus input/output circuit by a bus control circuit;

requesting authentication by said transmission packets from said digital signal receiver, to said external digital signal transmitter apparatuses connected to the digital signal receiver apparatus; and performing the authentication to said external signal transmitter apparatuses by said transmission packets and received packets and sharing key information for decrypting said digital signal on the basis of said key information.

14. A digital signal processing method using a digital signal receiver apparatus which has at least one input terminal including an input terminal from a digital signal bus and a switching circuit for selecting said input terminal, connected to external digital signal transmitter apparatuses through said digital signal bus, said method comprising the step of:

when said input terminal connected to said digital signal bus is selected by said switching circuit, converting an instruction from a controller to a transmission packet and converting a received packet to an instruction to said controller in a packets processing circuit;

transmitting said transmission packets from the packets processing circuit to said digital signal bus and receiving said packets from said digital signal bus to said packets processing circuit via a digital signal bus input/output circuit by a bus control circuit;

requesting authentication by said transmission packets from said digital signal receiver, to said external digital signal transmitter apparatuses connected to the digital signal receiver apparatus; and performing the authentication to said external signal transmitter apparatuses by said transmission packets and received packets and sharing key information for decrypting said signal on the basis of said key information.

15. A digital signal processing method using a digital signal receiver apparatus which has a controller, comprising the steps of:

when said controller searches for external digital signal transmitter apparatuses connected to said digital signal bus and then finds the external digital signal transmitter apparatuses, converting an instruction from a controller to transmission packets and converting received packets to an instruction to said controller in a packets processing circuit;

transmitting said transmission packets from the packets processing circuit to said digital signal bus and receiving said received packets from said digital signal bus to said packets processing circuit via a digital signal bus input/output circuit by a bus control circuit;

requesting authentication by said transmission packets from said digital signal receiver, to said external digital signal transmitter apparatuses connected to the digital signal receiver apparatus; and performing the authentication to said external signal transmitter apparatuses by said transmission packets and received packets and sharing key information for decrypting said digital signal on the basis of said key information.

16. A digital signal processing method using a digital signal receiver apparatus which has a controller, comprising the steps of:

when said controller finds external digital signal transmitter apparatuses which are transmitting a digital video signal and/or a digital audio signal, converting an instruction from a controller, to transmission packets and converting received packets to an instruction to said controller in a packets processing circuit;

transmitting said transmission packets from the packets processing circuit to said digital signal bus and receiving said received packets from said digital signal bus to said packets processing circuit via a digital signal bus input/output circuit by a bus control circuit;

requesting authentication by said transmission packets from said digital signal receiver, to said external digital signal transmitter apparatuses connected to the digital signal receiver apparatus; and performing the authentication to said external signal transmitter apparatuses by said transmission packets and received packets and sharing key information for decrypting said digital signal on the basis of said key information.

17. A digital signal processing method using a digital signal receiver apparatus which has a controller, comprising the steps of:

when said controller finds external digital signal transmitter apparatuses which are transmitting a digital video signal and/or a digital audio signal that cannot be copied freely, converting an instruction from a controller to transmission packets and converting received packets to an instruction to said controller in a packets processing circuit;

transmitting said transmission packets from the packets processing circuit to said digital signal bus and receiving said received packets from said digital signal bus to said packets processing circuit via a digital signal bus input/output circuit by a bus control circuit;

requesting authentication by said transmission packets from said digital signal receiver, to said external digital signal transmitter apparatuses connected to the digital signal receiver apparatus; and performing the authentication to said external signal transmitter apparatuses by said transmission packets and received packets and sharing key information for decrypting said digital signal on the basis of said key information.

18. A digital signal processing method using a digital signal receiver apparatus which has a controller, comprising the steps of:

when said controller finds external digital signal transmitting apparatuses which were previously registered, converting an instruction from a continuer to transmission packets and converting received packets to an instruction to said controller in a packets processing circuit;

transmitting said transmission packets from the packets processing circuit to said digital signal bus and receiving said received packets from said digital signal bus to said packets processing circuit via a digital signal bus input/output circuit by a bus control circuit;

requesting authentication by said transmission packets from said digital signal receiver, to said external digital signal transmitter apparatuses connected to the digital signal receiver apparatus; and performing the authentication to said external signal transmitter apparatuses by said transmission packets and received packets and shaving key information for decrypting said digital signal on the basis of said key information.

19. A digital signal processing method using a digital signal receiver apparatus which has a controller, comprising the steps of:

when said controller finds external digital signal transmitter apparatuses which said digital signal receiver apparatuses received a digital video signal and/or a digital audio signal from in the past, converting an instruction from a controller to transmission packets and converting received packets to an instruction to said controller in a packets processing circuit;

transmitting said transmission packets from the packets processing circuit to said digital signal bus and receiving said received packets from digital signal bus to said packets processing circuit via a digital signal bus input/output circuit by a bus control circuit;

requesting authentication by said transmission packets from said digital signal receiver, to said external digital signal transmitter apparatuses connected to the digital signal receiver apparatus; and performing the authentication to said external signal transmitter apparatuses by said transmission packets and received packets and sharing key information for decrypting said digital signal on the basis of said key information.

* * * * *